United States Patent

[11] 3,631,518

| [72] | Inventor | Sebastiano Battaglia<br>71, Via Isonzo, Casalecchio di Reno,<br>Bologna, Italy |
|---|---|---|
| [21] | Appl. No. | 9,556 |
| [22] | Filed | Feb. 9, 1970 |
| [45] | Patented | Dec. 28, 1971 |
| [32] | Priority | Feb. 21, 1969 |
| [33] | | Italy |
| [31] | | 6820 A/69 |

[54] STRIP-CHART PORTABLE ELECTROGRAPHIC APPARATUS
6 Claims, 8 Drawing Figs.

[52] U.S. Cl. .................................................. 346/145,
D52/2
[51] Int. Cl. ................................................ G01d 11/30
[50] Field of Search ............................................ 346/145,
76, 33 ME; 128/2.06 G, 2.06 R; 324/156; 73/431;
D52/6, 2

[56] References Cited
UNITED STATES PATENTS
3,006,712 10/1961 Eichacker ..................... 346/14

| 3,051,408 | 8/1962 | Finch .......................... | 346/145 X |
| 3,082,970 | 3/1963 | Rasmussen .................... | 346/145 X |
| 3,369,249 | 2/1968 | Argy et al. ..................... | 346/33 ME |
| 3,434,149 | 3/1969 | Brousseau et al. ............. | 346/145 X |

Primary Examiner—Joseph W. Hartary
Attorney—B. P. Fishburne, Jr.

ABSTRACT: A strip-chart portable electrographic apparatus, comprising an electronic amplifier unit, a recording galvanometer provided with a writing pen or stylus and a unit for advancing a strip chart at a predetermined speed and the electric battery or auxiliary source of current for operating the above units are arranged in compartments of a flat valiselike case adapted to be connected to a strap for slinging on the operator's shoulders, with one of the narrow case sides up. On this side the control panel and the supporting plate for the strip-chart end are arranged, at reach of the operator's hands and under his eyes.

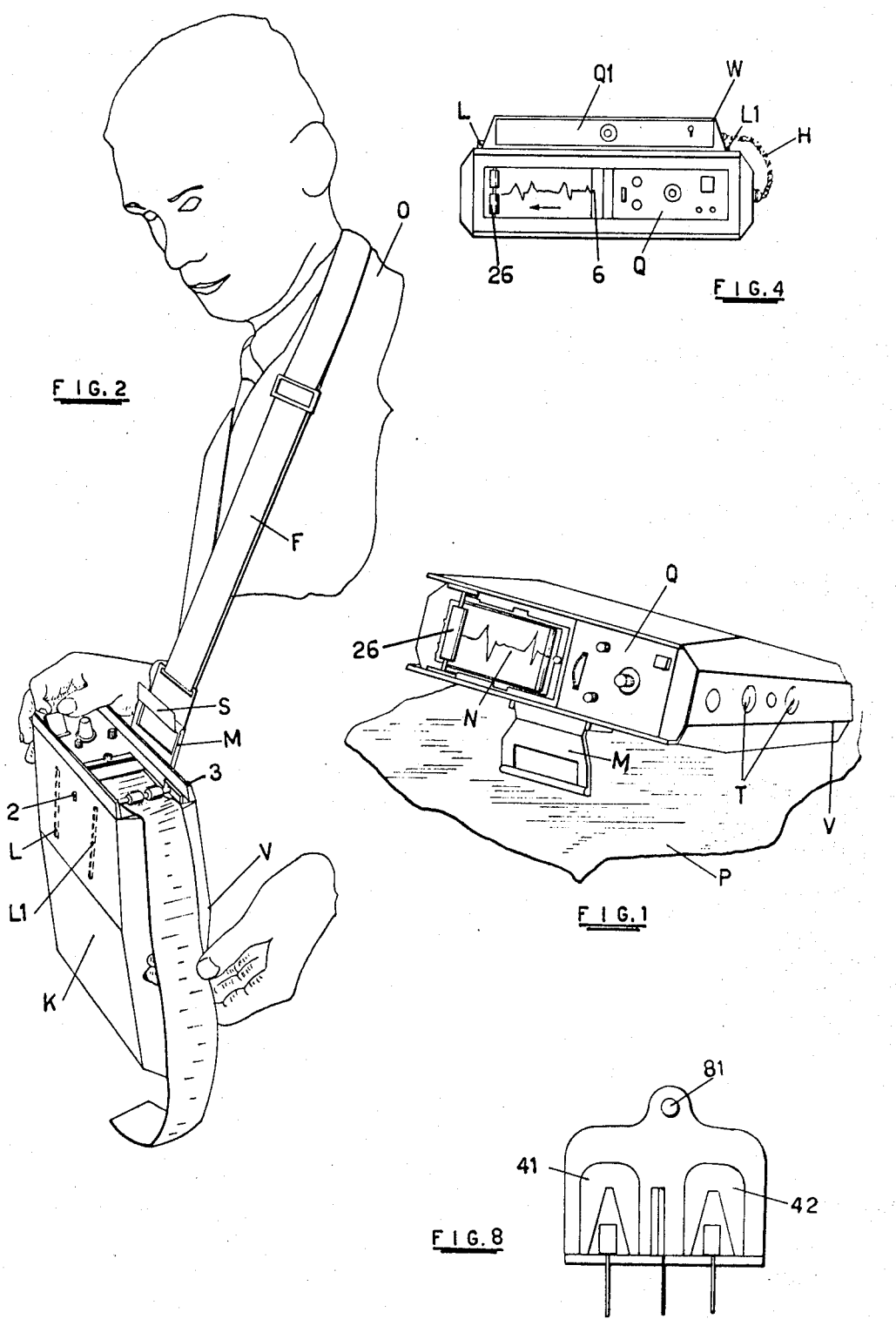

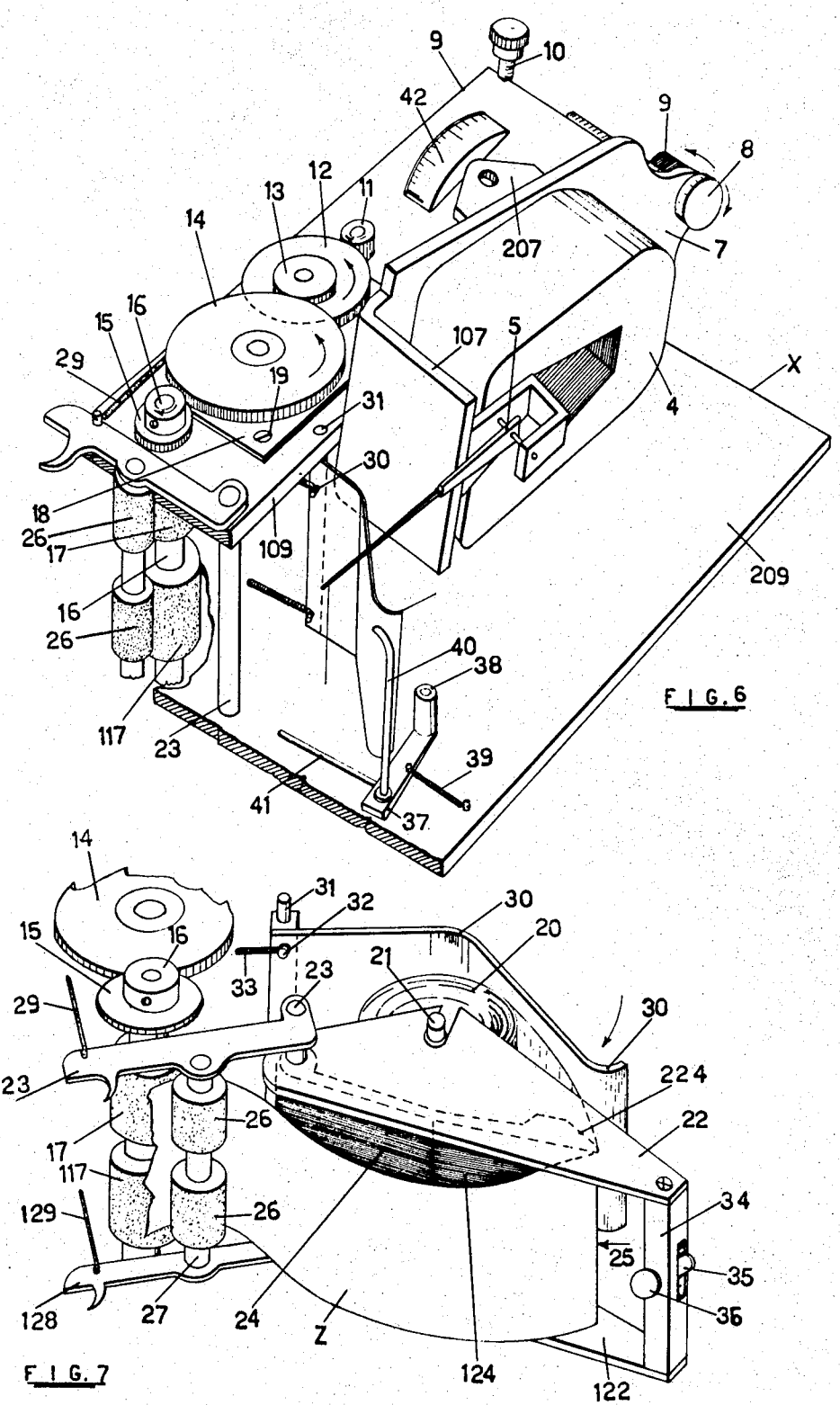

STRIP-CHART PORTABLE ELECTROGRAPHIC APPARATUS

This invention relates to the electrographic apparatus, and particularly to the electrocardiographic apparatus and aims to provide an easily portable, substantially flat prismatic rectangular, battery-operated strip chart electrographic apparatus, which may be even slung over the shoulder by means of a strap in such a manner as to be ready to operate, for example on a patient lying in a bed, while the control means of the apparatus and the tail end of the recorded tape are exposed on the narrow top side of the case, at reach of the operator's hands and under his eyes.

Another object of the invention is to provide a simple easily portable substantially flat, preferably prismatic rectangular-cased strip-chart electrographic apparatus wherein the parts which are subject to be revised or substituted, such as the recording galvanometer provided with a writing stylus or pen, the band or strip chart on which the curve is recorded, the batteries for operating the apparatus and the transmission gears for driving the chart at a predetermined speed may be exposed so as to be readily checked and replaced, if necessary.

Other objects and advantages of the invention will be readily apparent from the following specification of one preferred embodiment of a portable electrographic apparatus according to the invention, which is diagrammatically shown by way of example in the accompanying drawings forming part of the specification.

In the drawings:

FIG. 1 shows in a perspective view a flat portable strip-chart electrographic apparatus supported in one of the operating positions, inclined, like a reading desk, on a table or the like;

FIG. 2 shows the same apparatus in another operating position, slung over the operator's shoulder by means of a strap with one of the narrow sides of the case, bearing the control panel and recorded chart end, on top;

FIG. 4 shows the arrangement, on one of the narrow sides of the apparatus, of a control panel and ledger plate for the recorded chart end;

FIG. 6 shows diagrammatically a galvanometer provided with a writing stylus or pen and hinged so as to be inspectable and adapted to be arranged in operating position with respect to the adjoining strip chart-driving apparatus;

FIG. 7 shows the arrangement and mounting details of the chart-driving apparatus fitted in the case; and FIG. 8 shows an embodiment of an apparatus provided with a pair of writing galvanometers.

Figure 3:
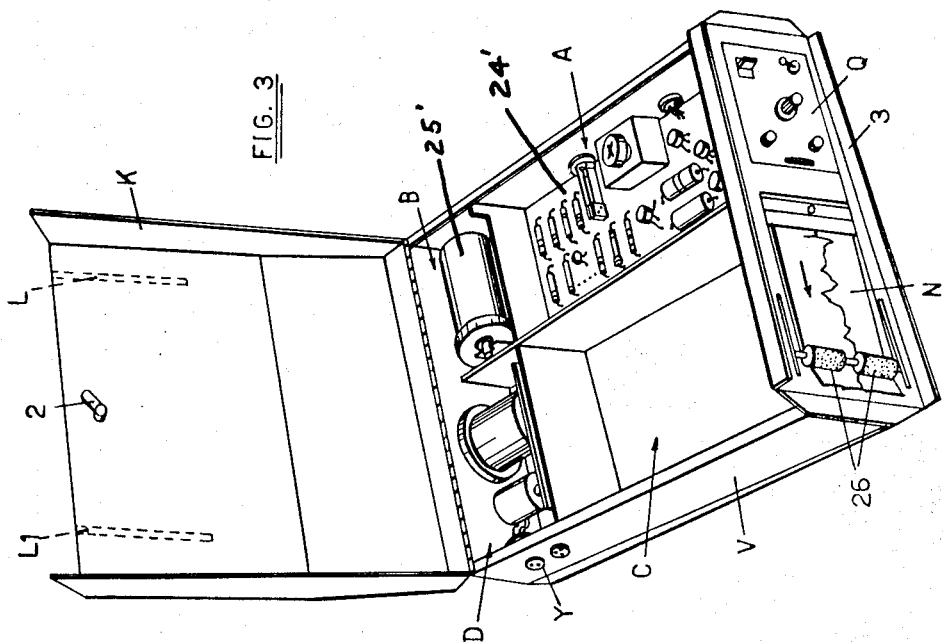
FIG. 3 shows the case of the apparatus with the cover plate swung in open position and showing one preferred system of partitions.

With reference to FIGS. 1 through 4 of the drawings, it is apparent that the portable strip-chart electrographic apparatus according to the invention comprises a small valiselike, substantially prismatic-rectangular case V provided with a cover K hinged as shown at 1 to one of the narrow sides of the case (see FIG. 3) and provided with a bolt 2 for holding the cover K closed, when desired.

As a difference from the conventional electrographic apparatus, in the portable apparatus according to the invention the case is provided on one of its narrow sides with a rectangular frame 3 in which the control panel Q and the window through which the strip chart N appears, as well as the pinch rolls 26 are mounted which, by coacting with the underlying driving rolls 17-117 (FIGS. 6 and 7) pull the strip chart out of the case.

On one side of this rectangular frame 3 a rigid handle M is hinged which, when the apparatus is laid on a table P, FIG. 1, may be turned as shown in FIG. 1 so as to serve as a supporting foot for holding the case inclined, with the control panel Q and recorded tape end well visible to an operator looking in that direction. The same handle M may be employed as means for suspending the whole apparatus from a buckle S of a strap F adapted to be slung over the shoulders of the operator O, as shown in FIG. 2, in which case the frame 3 enclosing the control panel and chart end section are just under the operator's eyes, while both the control knobs on the panel and the chart end are in a position as to be readily seized by the operator's hands.

In order to render this arrangement possible, the interior of the case V is divided preferably into four compartments, as clearly shown in FIG. 1, namely: 1st) a compartment A lying under the panel Q and designed for containing the electric circuits, together with conventional electronic tubes or transistors for amplifying the very small potentials or currents to be measured and recorded such amplifying means being shown at 24'; 2nd) a compartment B, adapted to contain the electric battery 25' for independent operation of the apparatus, fitted on the rearward extension of compartment A; 3) a large compartment C lying sidewise of compartment A and containing all movable parts of the apparatus, including the galvanometer or galvanometers 4 provided with the swinging arm 5 carrying the writing pen or stylus 5; and the motor unit for driving the strip chart N, and other mechanical parts and 4) a fourth compartment D containing the elements of an AC adapter and battery recharger comprising a conventional electric transformer and a rectifying and leveling unit, for permitting the connection of the apparatus to the electric mains of a household installation.

In order to permit the above arrangement, the parts contained in the compartment C have been designed and arranged in a peculiar manner, as will be apparent from the following detailed specification.

Figure 5:
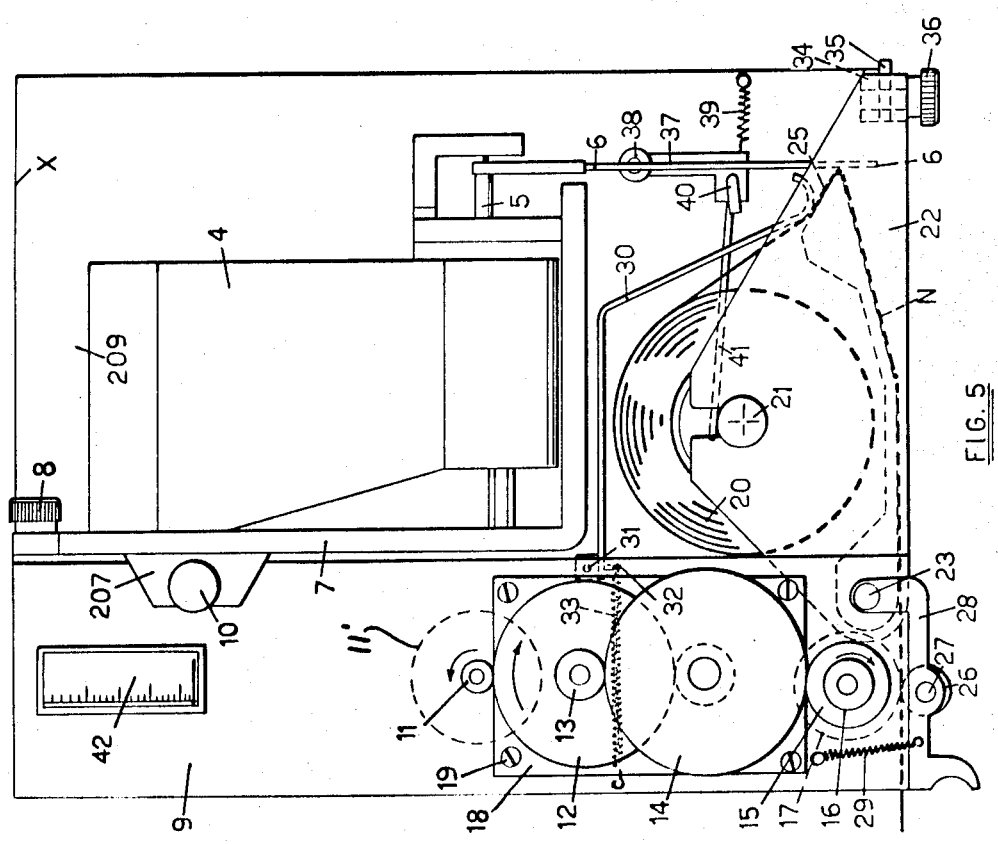
FIG. 5 is a top view of the interior of an electrographic apparatus, showing the arrangement of the various parts inside of the case shown open in FIG. 3.

Referring particularly to FIGS. 5 and 6, it may be seen that the galvanometer magnet 4 is fastened to a plate 7 provided on one side with a right-angled extension 107 and hinged by its opposite end to a pivot pin 8 which is parallel to the pivot pin about which the swinging arm 5 of the galvanometer is swingably mounted.

Pivot pin 8 is fastened to a frame 9 serving for mounting the whole galvanometer into the compartment C of the case V. Plate 7 is also provided with a lug 207 having a bore through which a screw-threaded stem ending with a knob 10, FIG. 5, may be screwed whenever is desired to lock the galvanometer so as to avoid its swinging about pivot pin 8.

FIG. 8 shows an arrangement of a pair of writing galvanometers 41 and 42 arranged in parallel and fastened to a single plate 71 (having a greater width than plate 7) and fastened by means of pivot pin 81. The arrangement of a combination of a plurality of galvanometers in a single apparatus is per se known and need not a greater explanation. Anyway, also in this case pivot pin 81 is parallel to all pins on which the pen are swingably mounted in the galvanometers and permits, whenever desired, to swing the galvanometers as a single unit out of the compartment of the case, for checking purposes.

Referring now to FIG. 6, it may be seen that frame 9 comprises also two parallel plates 109 and 209 between which a conventional chart-driving motor 11' is mounted, whose shaft is provided at its end with a pinion 11 constituting the driving pinion of a gear train 12-13-14, ending with an output pinion 15, this latter being fastened to the end of a shaft 16 carrying the chart-dragging rolls 17-117 between which and the overlying rolls 26-126 the strip chart is pulled at a predetermined speed.

The gears of gear train 12-13-14 may be of variable speed ratio, thus permitting of varying the advancing speed of the strip chart. To this purpose, they may be mounted on a single plate 18, or also between a pair of plates permitting of changing a whole gear train with another gear train having a different speed ratio by simply removing and fastening a gear-carrying plate 18 by means of screws 19 from or to plate 109.

Chart roll 20 is fitted onto a pivot pin 21 supported by slitted plates 22-122 pivotally mounted on pivot pin 23 fitted between plates 109 and 209.

Between plates 22 and 122 the shaped supporting member 24 is transversally fastened, on which the tail end Z of the strip chart on which the graphs are recorded is slidably mounted. Said supporting member has two sections 124 and 224 set at an angle so as to form between them a sharp edge 25 on which the chart end 2 comes into contact with the pen or stylus 6 (which may be suitably heated) and thus the curve is produced.

The chart end is pinched between driving rolls 17–117 and pinch rolls 26–126 mounted on a pivot 27 between swinging arms 28–128 urged towards rolls 17–117 by springs 29–129.

The chart is urged towards edge 25 by the free end of a shaped ledger plate 30 swinging on pivot 31 and urged with its free end towards wall section 224 by springs 33 anchored to radial pin or pins 32.

Plates 22–122 are connected together by means of transversal bar 34 provided with a slit through which a bolt 35 is mounted, which by being rotated by a button 36 may lock and unlock the unit carrying the roll 20.

In order to avoid that, when the roll carrier is introduced into the case, the pen or stylus 6 comes to stumble against the chart end, a device has been provided for keeping the pen clear of the tape until it has reached the working position.

This device, which has been particularly shown in FIGS. 5 and 6, comprises an arm 37 fulcrumed on a pivot pin 38 fastened to plate 209. Said arm 37 is pulled by spring 39 so as to keep a stirrup 40 and the pen 6 bearing thereon clear of the writing edge 25. Arm 37 is provided with an extension 41 fastened at right angles thereon and extending on the path of the chart roll arbor or supporting pin 21 so that when the roll is brought back to working position, pin 21 abuts against the said arm extension 41 and permits to pen 6 to bear again on the writing edge 25.

It may be mentioned that a plate 9 is left free near the gear train, and this may be employed for fitting the dial 42 of some useful measuring instrument, such as an accumulator battery voltmeter.

It might be also mentioned that, as shown in FIGS. 2 and 3, a pair of rails L–L1 may be provided on the cover K adapted to serve as fastening means for a supplementary apparatus W, FIG. 4, provided with a control panel Q1 and adapted to be connected by cables H to the main apparatus. This may be provided, as usual, with plug sockets T or the like.

Of course, the strip-chart electrographic apparatus according to the invention, which may be suitable for many measurements such as temperature, pressure, flow, level and electric measurements, and is particularly adapted for clinical purposes, such as for the taking of electrocardiograms or the like, may undergo numerous changes within the limits of the appended claims.

I claim:

1. A portable strip-chart electrographic apparatus comprising electrically operated mechanical means, including a recording galvanometer and recording strip-chart driving mechanical unit, operating at the unison with the writing galvanometer for producing electrographic curves; electronic amplifying means for amplifying electric input signals and feeding the amplified currents to said recording galvanometer; and an auxiliary source of current for operating both said mechanical means and said electronic amplifying means; characterized by the feature that said electrically operated mechanical means and said electronic amplifying means are so designed and arranged as to be encased in two sidewise arranged prismatic-rectangular compartments of a flat valiselike case, provided with a hinged top cover plate, said compartments being adjoining to the first of the narrow sides of the case, while the source of current is arranged adjoining to the second of the narrow sides of the case, whereby in correspondence of the first of said narrow sides of the case, on the side opposite to said top cover, a handle is arranged, which may serve for transportation of the apparatus like a handbag, for laying same inclined on a table and for suspending same from a strap adapted to be slung over the operator's shoulder; on said first-named narrow side of the case being arranged both the electric control panel and the ledger supporting the recorded end of the strip chart, while on the top edge of said second-named narrow side being hinged a cover plate for closing said case.

2. A portable electrographic apparatus according to claim 1, wherein the said auxiliary source of current arranged adjoining the inside of the second of said narrow sides of the said case comprises an electric battery and an alternating current adapter for transforming the household distributing net alternating current to direct current adapted both for charging the said battery and for feeding the electric appliances of the apparatus.

3. A portable strip-chart electrographic apparatus according to claim 1, wherein the said cover is provided with means for fastening thereto a supplementary apparatus with its front panel in the same direction as the control panel of the said electrographic apparatus and provided with a cable for connecting same to the electric appliances of the electrographic apparatus proper, plug-in sockets being provided on one of the narrow sides of the case of the electrographic apparatus for effecting the necessary electric connections.

4. A portable electrographic apparatus according to claim 1, wherein the said electrically operated mechanical means, including the recording galvanometer comprise a rigid frame and a pivot pin for swinging said means out of the case, whenever desired, means being provided for avoid stumbling of the recording pen or stylus against the said chart during the swinging of said means.

5. A portable electrographic apparatus according to claim 1, wherein the driving in timed relation of the strip chart is effected from an electric motor through a speed-down gear train, arranged on the top of the mechanical unit, said gear train including a plurality of intermeshing gears fitted on a supporting plate in such a manner as to be adapted to be substituted by another set of intermeshing gears producing a different speed-down ratio without dismounting the internal parts of said mechanical unit.

6. A portable strip-chart electrographic apparatus according to claim 5, wherein the strip-chart is drawn from a roll provided with a supporting arbor mounted between a pair of supporting plates hinged to a pivot which is parallel to said roll-supporting arbor, means being provided for removing said roll and swinging the supporting plate out of the case.

* * * * *